US006970767B2

(12) United States Patent
Teraoka

(10) Patent No.: US 6,970,767 B2
(45) Date of Patent: Nov. 29, 2005

(54) DIE HEIGHT ADJUSTING DEVICE FOR PRESSING MACHINE

(75) Inventor: Kenichi Teraoka, Kanazawa (JP)

(73) Assignees: Komatsu Ltd., Tokyo (JP); Komatsu Industries Corp., Tokyo (JP)

( * ) Notice: Subject to any disclaimer, the term of this patent is extended or adjusted under 35 U.S.C. 154(b) by 257 days.

(21) Appl. No.: 10/373,957

(22) Filed: Feb. 26, 2003

(65) Prior Publication Data

US 2003/0200879 A1 Oct. 30, 2003

(30) Foreign Application Priority Data

Apr. 26, 2002 (JP) ............................ 2002-125865

(51) Int. Cl.[7] ............................................ G06F 19/00
(52) U.S. Cl. ........................ 700/206; 700/159; 100/43
(58) Field of Search ........................... 700/206; 100/4, 100/43; 425/145

(56) References Cited

U.S. PATENT DOCUMENTS 3,596,121 A * 7/1971 Chang ........................ 310/166
5,362,222 A * 11/1994 Faig et al. .................. 425/145

FOREIGN PATENT DOCUMENTS

JP 61-24392 Y2 7/1986

* cited by examiner

*Primary Examiner*—Leo Picard
*Assistant Examiner*—Sheela S. Rao
(74) *Attorney, Agent, or Firm*—Frishauf, Holtz, Goodman & Chick, P.C.

(57) ABSTRACT

A die height adjusting device for a pressing machine, which withstands high vibrations and high impacts during pressing work, and is capable of realizing high precision of a slide position, is provided. For this purpose, the die height adjusting device includes an induction motor (9), which performs die height adjustment of a slide (3), and an inverter (17) which performs a speed control of the induction motor. Voltage is applied to the induction motor for a predetermined period of time, and thereby a predetermined amount of die height adjustment is performed.

10 Claims, 6 Drawing Sheets

DIE HEIGHT ADJUSTING DEVICE FOR PRESSING MACHINE

TECHNICAL FIELD

The present invention relates to a die height adjusting device for a pressing machine.

BACKGROUND ART

High precision of press worked products (precision of shapes and dimensions is high), and speedup of pressing work to improve productivity have been long demanded in recent years. As a press to meet this demand, the one, in which a ball screw is linearly driven in an up-and-down direction with, for example, a servo motor and thereby the position and speed of the slide are controlled with high precision to drive the slide precisely up and down, is proposed.

Meanwhile, the one, in which die height (so-called height from a top face of a bolster to a bottom face of a slide at the bottom dead center of the slide) is adjusted with a motor, is proposed in order to attain high precision of press worked products and speedup of press production as described above. For example, Japanese Utility Model No. 61-24392 discloses a slide adjusting device shown in FIG. 8, and it will be explained below based on FIG. 8. A frame 40 is provided with a plunger 52 to be movable up and down, the plunger 52 is connected to a connecting rod 51 with a pin 41. A small diameter part 42 is formed at a lower part of the plunger 52, and a step part 43 is formed between the small diameter part 42 and an upper part of the plunger 52. A screw hole 44 is formed at the small diameter part 42 from a lower surface toward an upper position, a slide adjusting screw 53 is fitted in the screw hole 44, and a gear 54 is formed at a lower part of the slide adjusting screw 53.

The lower part of the plunger 52 is fitted in a hole-shaped part 46 of a slide 45 via an O-ring. The gear 54 of the slide adjusting screw 53 abuts to an upper surface **46*a* of a gear box of the slide 45, and a clearance is provided between a lower surface of the gear box and the gear 54. An oil chamber C is formed between the plunger 52, the step part 43, and a step part 47 of the hole-shaped part 46 of the slide 45. A slide adjusting motor 48 is attached to the slide 45, and a pinion 49 of the slide adjusting motor 48 is meshed with the gear 54 via an intermediate gear 50. The oil chamber C communicates with an output port of a change-over valve 55, and a pump port of the change-over valve 55 is connected to a discharge side of a pump 57. A return port of the change-over valve 55 communicates with a tank 58 via a check valve 59 which is opened at set pressure. The output port of the change-over valve 55 communicates with the tank 58 via an over load valve 60**.

However, the following problems occur to the above-described conventional die height adjusting device.

(1) When an ordinary induction motor (induction motor) is used as a die height adjustment driving source, a predetermined contactor (electro-magnetic switch) is operated to be on for a predetermined period of time by an inching operation by a button operation of an operator, or the like to drive the induction motor at a predetermined voltage at a time of die height adjustment. As a result, a slide adjustment amount is varied, and adjustment cannot be performed at high precision in a unit of 1/100 mm. The demand for higher precision (within a few microns) cannot be met by any means.

(2) A high-speed operation of a pressing machine is demanded to enhance productivity, but heat generated by the high-speed operation causes thermal expansion of a frame and the like, and gradually changes die height. Such a change in die height is dealt with by adjusting the die height, but the die height cannot be adjusted without stopping the pressing machine or stopping the slide at the top dead center.

(3) A high-speed operation of the pressing machine causes very large impacts and vibrations (for example, the maximum acceleration 50 G, G=9.8 m/s2) to the slide 45 at the time of forming and after forming. Consequently, use of a servo motor as the slide adjusting motor 48 attached to the slide 45 to perform highly precise die height adjustment causes a problem in durability.

SUMMARY OF THE INVENTION

The present invention is made in view of the above-described problems, and has its object to provide a die height adjusting device for a pressing machine which withstands high vibrations and high impacts during pressing work and is capable of realizing high precision of a slide position.

In order to attain the above-described object, the die height adjusting device for the pressing machine according to the present invention includes an induction motor which performs die height adjustment of a slide, and an inverter which performs a speed control of the induction motor.

According to the above constitution, the speed control of the induction motor is performed with use of the inverter, and therefore die height adjustment with high precision utilizing a low speed range becomes possible. The slide can be moved at a normal speed by utilizing a high speed range, and therefore time taken to adjust die height does not become extremely long. Further, since the induction motor has higher durability against impacts and vibrations as compared with a servo motor, it can withstand them even if it is installed in the slide of the press which is operated at a high speed.

Further, in the die height adjusting device for the pressing machine, a predetermined amount of die height adjustment may be performed by applying voltage to the induction motor for a predetermined period of time.

According to the above constitution, the predetermined amount of die height adjustment is performed by voltage application to the induction motor for the predetermined period of time, and therefore the control sequence is simple, thus providing the effect of arithmetic operation processing being completed in a short time. The unit adjustment amount of the die height corresponding to voltage applying time to the induction motor is set in consideration of a delay in actuation of the die height adjusting mechanism, inertia of the mechanism after voltage application and the like. Then, by setting the minimum necessary voltage applying time and a very small unit adjustment amount corresponding thereto, it becomes possible to respond sufficiently to die height adjustment especially for a thermal change of the press frame, of which adjustment amount of one time is very small.

Further, in the die height adjusting device for the pressing machine, a predetermined amount of die height adjustment may be performed in one cycle of vertical drive of the slide by applying voltage to the induction motor for a predetermined period of time within a time, during which the slide is located outside a forming area, in one cycle of the vertical drive of the slide.

According to the above constitution, the predetermined amount of die height adjustment is performed within one cycle of the slide. Accordingly, productivity of the press is improved without stopping the pressing machine for die height adjustment or stopping the slide at the top dead center. The die height adjustment for the thermal change of the press frame of which adjustment amount for one time is very small is made possible by setting the minimum necessary voltage applying time and a very small unit adjustment amount corresponding thereto. In addition, this can be carried out without stopping the pressing machine or stopping the slide at the top dead center, and therefore if the feedback of the slide position is always performed, the die height can be always kept fixed without being influenced by a thermal change, thus making the production including both high-speed production and high precision forming possible.

Further, in the die height adjusting device for the pressing machine: a position sensor which detects a slide position; and a controller, which issues a command to the inverter and performs a predetermined amount of die height adjustment by applying voltage to the induction motor for a predetermined period of time, based on the slide position which is inputted from the position sensor, are included; the controller may compare a target slide position and a present slide position, at a time of die height adjustment, and i) when the present slide position is at a lower position than the target slide position, the controller may continuously drive the induction motor at first to move the slide to a position higher than the target slide position, and after the movement, perform voltage application to the induction motor for a predetermined period of time at least once until the slide moves downward to reach the target slide position, and ii) when the present slide position is at a higher position than the target slide position, the controller may perform voltage application to the induction motor for a predetermined period of time at least once until the slide moves downward to reach the target slide position.

According to the above constitution, at the time of die height adjustment, the slide always approaches the target slide position from one direction and stops, and therefore a variation in the slide position precision at the time of positioning can be reduced by eliminating influence of a mechanical rattle such as backlash of the gears, thus making forming with high precision possible. Since the die height adjustment is performed by performing voltage application to the induction motor for the predetermined time once or a plurality of times, a very small amount of adjustment such as die height adjustment for a thermal change can be performed with high precision, and can be completed with arithmetic operation processing for a short time.

Further, in the die height adjusting device for the pressing machine: a position sensor which detects a slide position; and a controller, which issues a command to the inverter and performs die height adjustment by the induction motor, based on the slide position which is inputted from the position sensor, are included; at a time of die height adjustment, the controller may control the induction motor at a predetermined first speed to drive the slide to a position at a predetermined distance before a target slide position, and thereafter, control the induction motor at a second speed, which is lower than the first speed, to drive the slide to the target slide position.

According to the above constitution, when the slide comes near the position just before the target slide position at the time of die height adjustment, the slide moving speed is switched to a predetermined low speed from a normal speed, and the slide is stopped at the target slide position, thus providing the effect of making it possible to obtain high slide positioning precision.

Further, in the die height adjusting device for the pressing machine: at the time of die height adjustment, the controller may compare the target slide position and the present slide position before it controls the induction motor at the first speed and the second speed; and i) when the present slide position is located at a lower position than the target slide position, the controller may drive the induction motor to move the slide to a higher position than the target slide position, and thereafter, may control the induction motor at the first speed and the second speed to move the slide downward, and ii) when the present slide position is at a higher position than the target slide position, from this position, the controller may control the induction motor at the first speed and the second speed to move the slide downward.

According to the above constitution, at the time of die height adjustment, the slide always approaches the target slide position from one direction and stops, and therefore a variation in the slide position precision at the time of positioning can be reduced by eliminating the influence of a mechanical rattle such as backlash of the gears, thus making highly precise forming possible.

In the die height adjusting device for the pressing machine, the induction motor may be a slim type forming a flat shape with axial length thereof being short. According to this constitution, by using the slim type induction motor which forms a flat shape with the axial length being small, durability against the impacts and vibrations occurring to the slide during press working can be further improved, and an installation space can be easily secured even in a small slide.

BEST MODE FOR CARRYING OUT THE INVENTION

Preferred embodiments of the present invention will be explained below with reference to the drawings.

Figure 1:
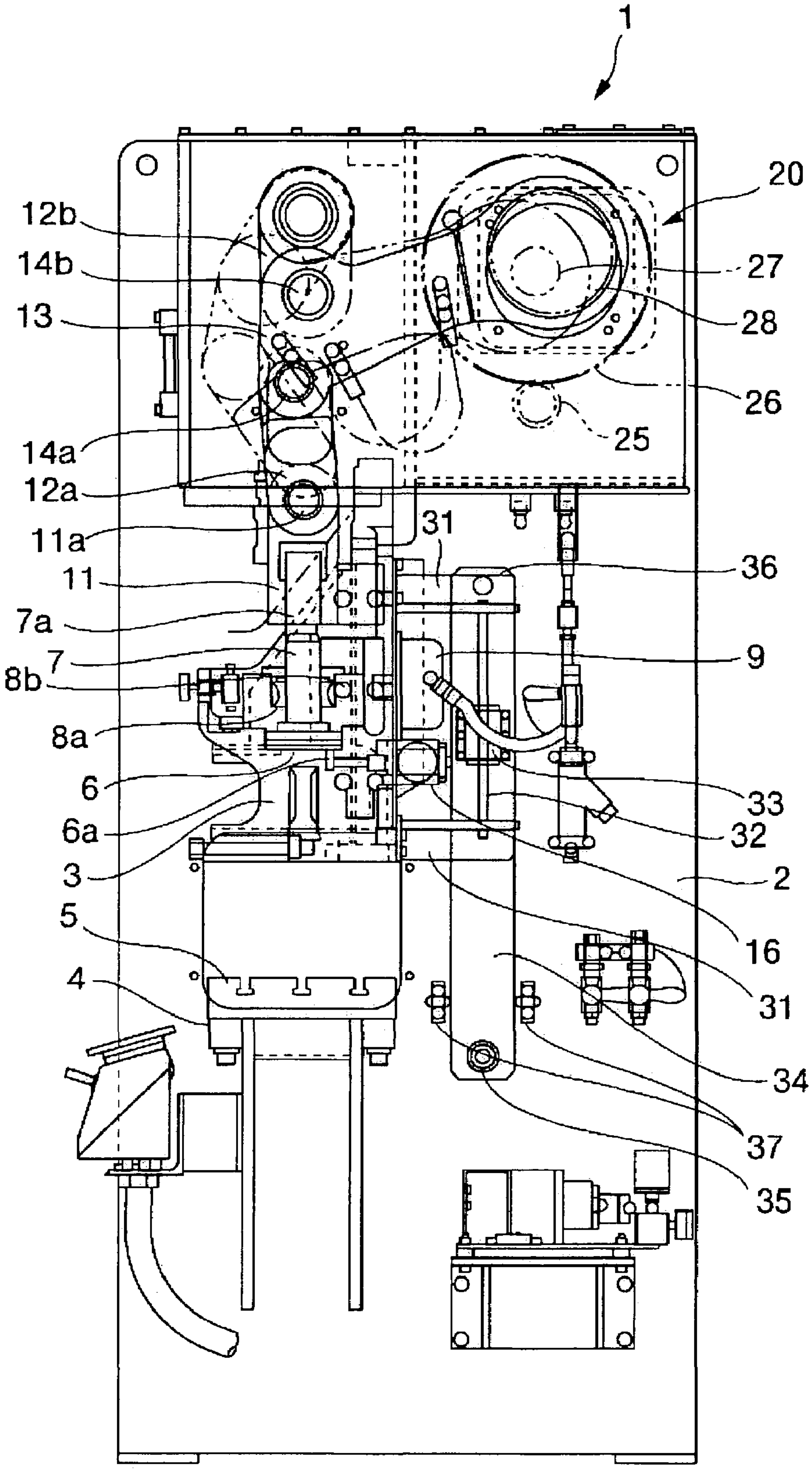
FIG. 1 is a partially sectional side view of a pressing machine according to the present invention.
Figure 2:
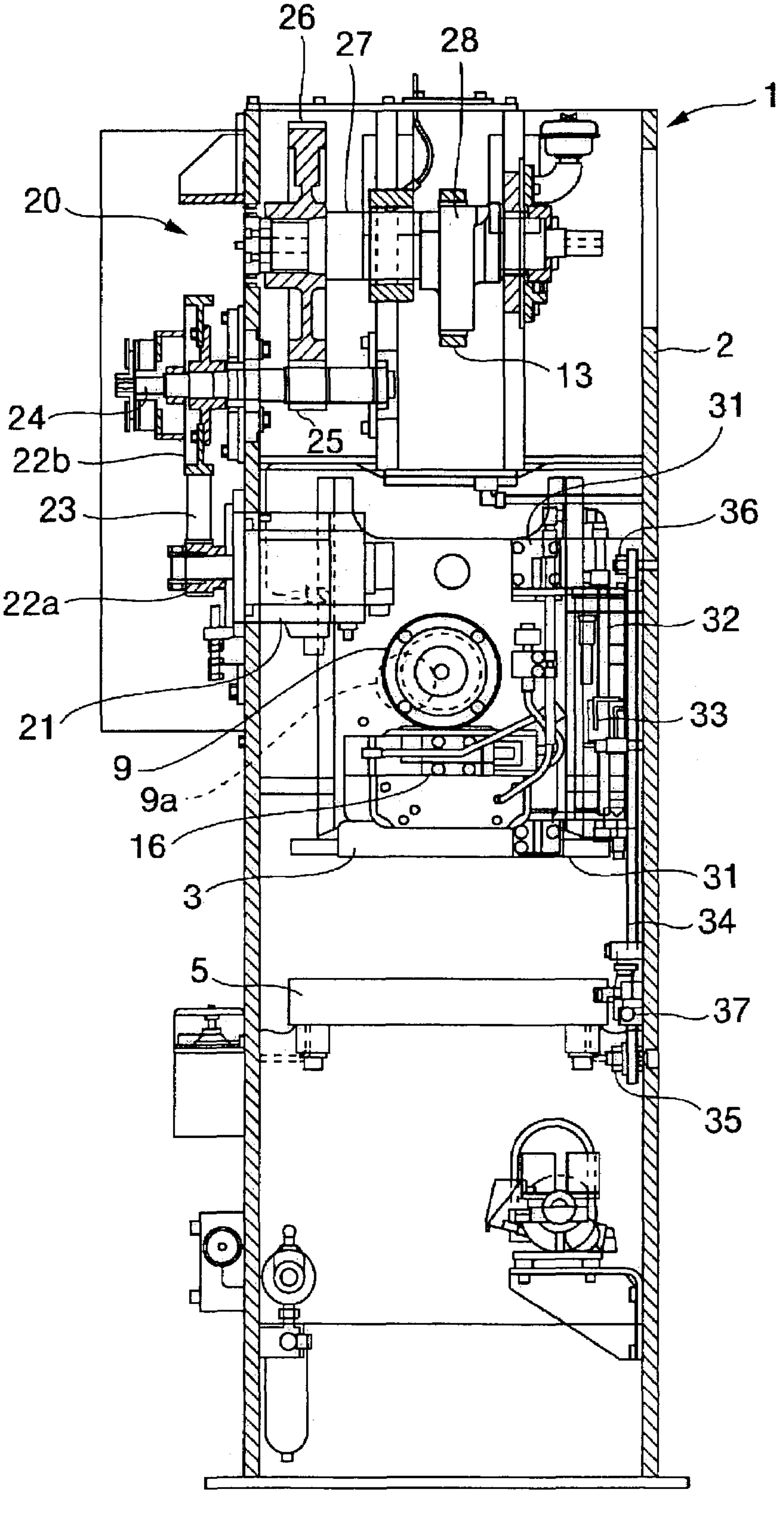
FIG. 2 is a partially sectional rear view of the pressing machine according to the present invention.

FIG. 1 and FIG. 2 are partially sectional side view and a partially sectional rear view of a pressing machine according to the present invention. In FIG. 1 and FIG. 2, a pressing machine 1 is a servo press, which drives a slide 3 by means of a servo motor 21, and performs die height adjustment by means of an induction motor 9. Explaining in detail, the slide 3 is supported at substantially a center part of a main body frame 2 of the pressing machine 1 to be movable up and down, and a bolster 5 mounted on a bed 4 is placed at a lower part opposing the slide 3. A main body part of a screw shaft 7 for adjusting die height is rotatably inserted in a hole formed in an upper part of the slide 3 in a state in which it is prevented from slipping off. A thread part 7*a* of the screw shaft 7 is exposed upward from the slide 3, and screwed into an internal thread part at a lower part of a plunger 11, which is provided above the screw shaft 7.

A worm wheel 8*a* of a worm gear 8 is attached at an outer circumference of a main body part of the screw shaft 7. A worm 8*b* of the worm gear 8, which is screwed into the worm wheel 8*a*, is connected to an output shaft of an induction motor 9, which is attached to a back part of the slide 3, via a gear 9*a*. The induction motor 9 is constituted to be compact in a flat shape with axial length thereof being made short. An upper part of a plunger 11 is rotatably connected to one end part of a first link 12*a* by means of a pin 11*a*. Two connection holes, which are provided at one side of a triaxial link 13, are rotatably connected by means of pins 14*a* and 14*b* between the other end part of the first link 12*a* and the other end part of a second link 12*b* one end of which is rotatably connected to the main body frame 2. A connection hole at the other side of the triaxial link 13 is rotatably connected to an eccentric shaft 28 of a slide driving section 20.

The servo motor 21 for driving the slide is attached to a side face part of the main body frame 2 with its center axis facing in a lateral direction of the press. A belt 23 is wound around between a first pulley 22*a* attached to an output shaft of the servo motor 21 and a second pulley 22*b* attached to an intermediate shaft 24 which is rotatably provided above the servo motor 21 with its center axis facing in the lateral direction of the press. The belt 23 is normally constituted by a timing belt. A drive shaft 27 is rotatably supported at the main body frame 2 above the intermediate shaft 24. A gear 26, which is attached at one end side of the drive shaft 27, is meshed with a gear 25 which is attached to the intermediate shaft 24. The eccentric shaft 28 is formed at substantially a center part of the driving shaft 27, and the other side of the triaxial link 13 is rotatably connected to an outer circumference part of the eccentric shaft 28.

A hermetically sealed oil chamber 6 is formed in a space from a lower end face part of the screw shaft 7 inside the slide 3, and the oil chamber 6 is connected to a change-over valve 16 via an oil passage 6*a* which is formed inside the slide 3. The change-over valve 16 switches supply and discharge of operating oil into the oil chamber 6. During pressing work, oil is supplied into the oil chamber 6 so that a pressing force during application of pressure is transmitted to the slide 3 via the oil inside the oil chamber 6. When excessive load is applied to the slide 3, and oil pressure inside the oil chamber 6 exceeds a predetermined value, oil is returned from a relieve valve to a tank, and the slide 3 is cushioned by a predetermined amount so that the slide 3 and the die are not broken.

A set of brackets 31 and 31, which are projected toward a side face part of the main body frame 2 from two of upper and lower spots, are attached at the back part of the slide 3, and a position detecting rod 32 is attached between the set of upper and lower brackets 31 and 31. A main body part of a position sensor 33 such as a linear scale is fitted onto the position detecting rod 32, which is provided with a scale part for position detection, to be movable up and down. The position sensor 33 is fixed at an auxiliary frame 34, which is provided at the side face part of the main body frame 2. The auxiliary frame 34 is formed to be vertically long in an up-and-down direction, and a lower part thereof is attached to the side face part of the main body frame 2 by means of a bolt 35. An upper part thereof is supported to be slidable in an up-and-down direction by means of a bolt 36 which is inserted in a long hole in the up-and-down direction (not shown), and side parts abut to and are supported by a set of front and rear support members 37 and 37.

Incidentally, die height is normally changed as a result that each part of the main body frame 2 is thermally expanded by heat generation of heat sources such as the servo motor 21 and a hydraulic pump (not shown) which are mounted inside the pressing machine during press operation. The die height is defined by the height from a top surface of the bolster 5 to an undersurface of the slide 3 at the slide bottom dead center. Namely, in the present invention, it is detected according to relative movement of the position sensor 33 which is fixed at the bolster 5 side, namely, the auxiliary frame 34 as described above, and the position detecting rod 32 which is attached to the slide 3 side. In the auxiliary frame 34, only either one of upper or lower side (the lower side in this example) is fixed to the main body frame 2, and the other side is made movable up and down and supported, and therefore it is not influenced by extension and contraction of the main body frame 2 caused by a change in temperature. Consequently, the position sensor 33 can accurately detect a slide position and die height without being influenced by extension and contraction of the main body frame by a change in temperature.

Figure 3:
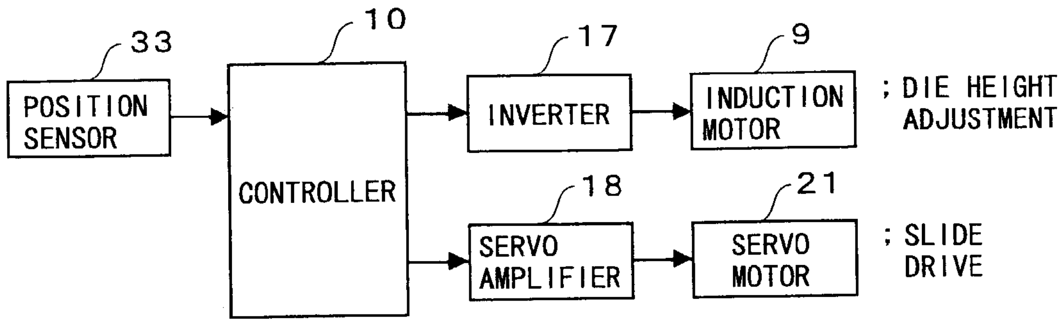
FIG. 3 is a control constitution block diagram according to the present invention.

A control constitution will be explained based on a control constitution block diagram shown in FIG. 3. An inverter 17, which controls the induction motor 9, is provided. The inverter 17 controls a frequency, a voltage value, a phase rotation direction of a three-phase motor drive voltage signal based on a die height adjustment speed command Cv which is inputted therein from a controller 10 to control rotational speed of the induction motor 9. Further, a servo amplifier 18, which controls the servo motor 21, is included. The servo amplifier 18 arithmetically operates a deviation value from a speed feedback signal from a speed sensor (not shown), which the servo motor 21 has, based on a slide speed command Cs which is inputted therein from the controller 10 to control the speed of the servo motor 21 to make the deviation value small.

The position of the slide 3, which is controlled by them, is detected by the position sensor 33 and is inputted into the controller 10. The controller 10 is constituted principally by a high-speed arithmetic device such as a computer device, controls the position and the speed of the slide 3 based on the slide motion which is previously set according to the types of works, and performs a control for die height adjustment so as to achieve a predetermined die height target value previously set.

Details will be explained below. The controller 10 previously stores relational expression of a rotational angle of the servo motor 21 and the position of the slide 3. The relational expression is determined by mechanical dimensions such as a reduction ration between the first pulley 22*a* and the second pulley 22*b*, a reduction ration between the gear 25 and the gear 26, an eccentric distance of the eccentric shaft 28, each distance between axes (namely, the eccentric shaft 28, the pins 14*a* and 14*b*) of the triaxial link 13, and lengths of the first link 12*a* and the second link 12*b*. Slide motion (relationship between the position and speed of the slide 3 and time) as a target is previously set in the controller 10. At the time of actual working, the controller 10 arithmetically operates the slide speed command Cs, namely, a speed command for the servo motor 21 for each predetermined servo arithmetic operation period time with reference to the above-described relational expression, based on a deviation value between the slide target position on the set slide motion and a detection signal from the position sensor 33, and outputs the speed command to the servo amplifier 18. As a result, the rotational speed and the rotational angle of the servo motor 21 are controlled, and predetermined link motion of the slide 3 can be obtained.

A target die height value according to each set slide motion is previously set in the controller 10. The controller 10 inputs therein a detection signal from the position sensor 33 in a predetermined timing (for example, at the time of the slide bottom dead center), and arithmetically operates a present die height value based on the position data. Then, it compares the target die height value and the present die height value to obtain the deviation value between both of them, and arithmetically operates the die height adjustment speed command Cv to reduce this deviation value to output it to the induction motor 9.

Figure 4:
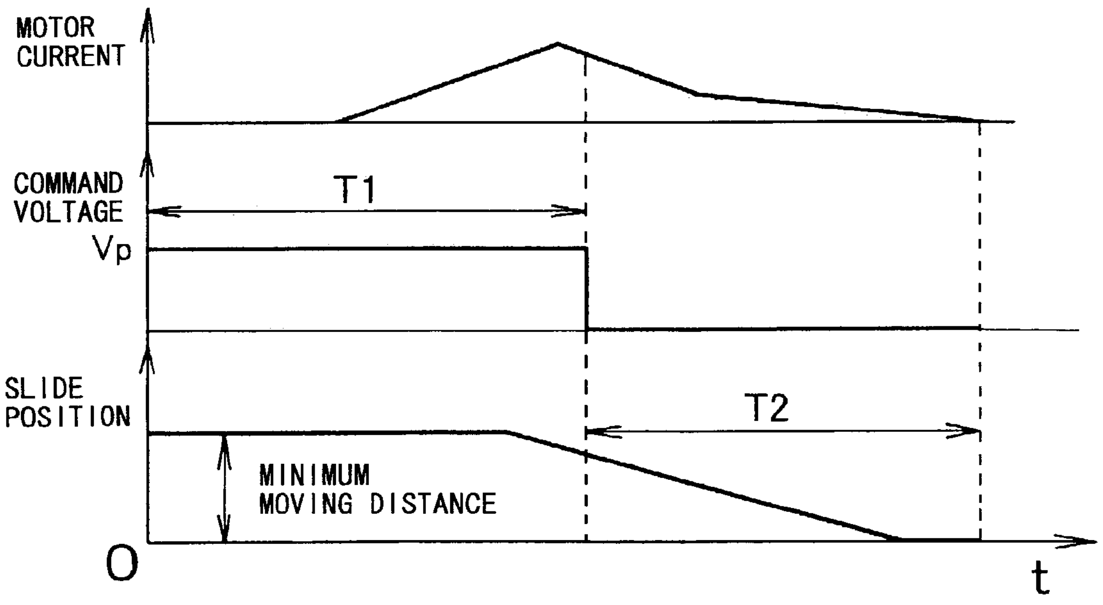
FIG. 4 is an explanatory diagram of a command and slide movement in a first embodiment of the present invention.

In the first embodiment, the above-described die height adjustment speed command Cv is made a voltage command as shown in FIG. 4. If the voltage command with a predetermined magnitude VP is outputted for a predetermined application time T1, an electric current of the induction motor 9 gradually increases during the application time T1 as shown in FIG. 4. When the electric current is more than predetermined actuation torque, the slide 3 starts to move at a speed corresponding to the magnitude of the voltage command in the direction corresponding to the application direction of the voltage command. Next, even if the voltage command is turned off after a lapse of the application time T1, the induction motor 9 runs a predetermined distance by inertia, and during the running-by-inertia time T2, the above-described motor current gradually reduces. As a result, the slide 3 moves a predetermined distance including the running-by-inertia distance, and the die height is adjusted.

Consequently, the magnitude VP of the voltage command and the application time T1 are previously set to be the magnitude and the length to meet the minimum target moving distance and the time of running by inertia. In the first embodiment, the minimum moving distance is within 5 microns, the total time of the application time T1 and the running-by-inertia time T2, namely, the time required for die height adjustment is set so as to be within the time which is the result of subtracting the time during which a load is exerted on the slide 3 from one cycle time. For example, one cycle time is 300 ms when the number of press strokes is 200 SPM, and if the time during which a load is exerted on the slide 3 is subtracted therefrom, the result is about 200 ms, and the die height adjustment has to be finished within this time period.

Figure 5:
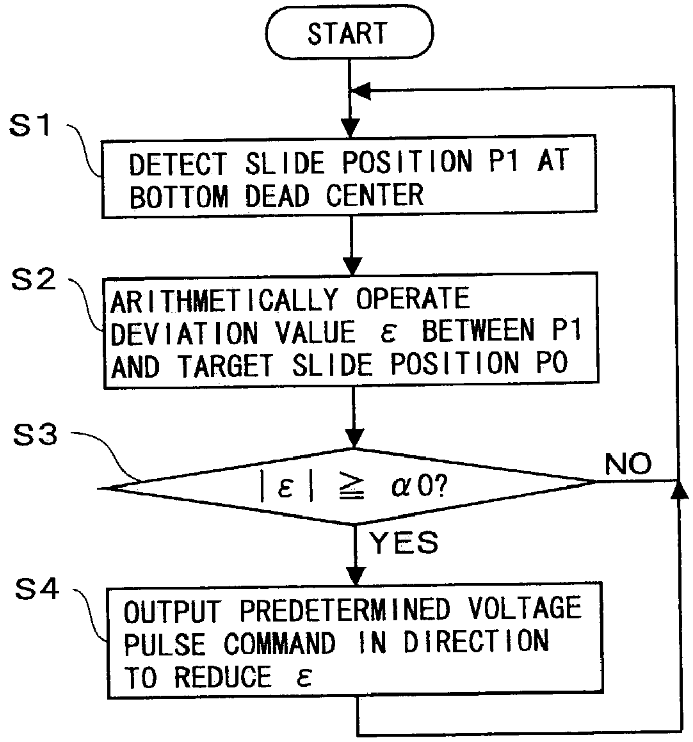
FIG. 5 is a control flowchart of the first embodiment.

Next, a die height control procedure with the above-described constitution will be explained based on a control flowchart shown in FIG. 5. At first, in step S1, a slide position P1 at the time of the bottom dead center is inputted from the position sensor 33. Next, in step S2, a deviation value $\epsilon$ between the inputted slide position P1 (this corresponds to the present die height) and a target slide position P0 corresponding to a target die height value is arithmetically operated. In step S3, it is checked whether an absolute value of the deviation value $\epsilon$ is not less than a predetermined allowable range $\alpha 0$. When the absolute value of the deviation value $\epsilon$ is less than the allowable range $\alpha 0$, a command is given to return to step S1 and the above process steps are repeated. When it is not less than the allowable range $\alpha 0$, a predetermined voltage command in a direction to reduce the deviation value $\epsilon$ is outputted to adjust the die height in step S4, and thereafter, a command is given to return to step S1 to repeat the above process steps.

A change in die height, which is caused by thermal deformation, is normally in a direction in which the die height is gradually elongated, but the case in which it becomes short can be sometimes considered. In this case, the drive direction of the motor is changed, which can be considered to cause the situation in which an effect of a mechanical rattle such as backlash of the gears in the die height adjusting mechanism occurs, and the die height adjustment amount is not obtained as expected. However, die height adjustment is performed for each cycle in the first embodiment, and therefore the die height can be adjusted to a predetermined height after the lapse of several cycles. If the die height is always monitored, the die height adjustment is automatically performed before a die height change to such an extent as influences the products occurs, and therefore the products are not adversely effected.

According to the first embodiment, a predetermined amount of die height adjustment is performed by application of voltage for a predetermined period of time, and therefore a control sequence is simple, thus making it possible to complete the control of die height adjustment within a predetermined short arithmetic operation processing time. Accordingly, die height adjustment can be automatically performed during continuous running of the pressing machine without stopping the slide at the top dead center. Consequently, productivity by the pressing machine can be improved, and the die height amount is always kept highly precise to make it possible to work the products with high precision. Further, when the slim induction motor 9 in a flat shape with axial length thereof being made small is used as a motor for die height adjustment, durability against large impacts and vibrations exerted on the slide 3 is further increased. In addition, an installation space therefor can be easily secured in the small slide 3.

Figure 6:
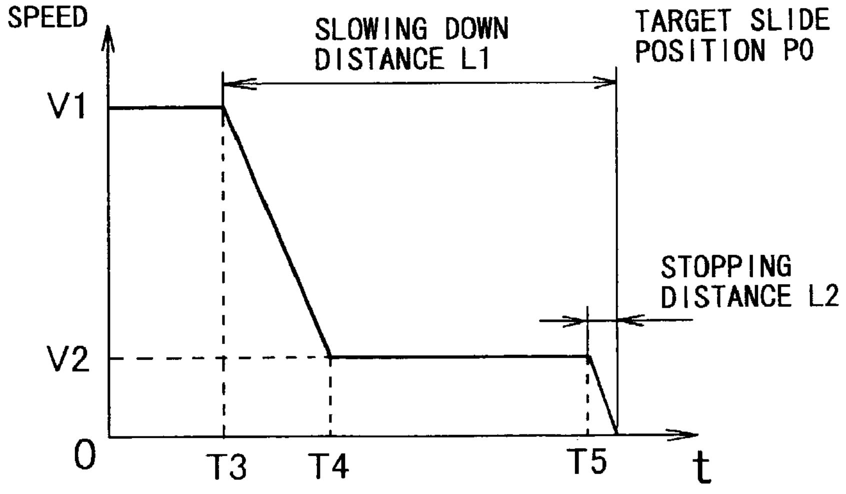
FIG. 6 is a control time chart of a slide speed in a second embodiment.

Next, a second embodiment will be explained based on FIG. 6 and FIG. 7. The second embodiment is the same as the first embodiment in a control constitution, but it differs from the first embodiment in a control method of slide speed at the time of die height adjustment. FIG. 6 is a time chart showing a control sequence of the slide speed of this embodiment. At a time of starting the die height adjustment, a speed command of a predetermined first speed V1 is outputted to the inverter 17, and when the slide comes to a position which is at a predetermined slowing down distance L1 before the target slide position P0 corresponding to a target die height value (a time T3 shown in FIG. 6), a speed command to slow down to a second speed V2, which is lower than the first speed V1, is outputted with a predetermined deceleration curve (up to a time T4 shown in FIG. 6). Thereafter, the command for the second speed V2 is kept, and when the slide comes to a position at a predetermined slowing down distance L2 before the target slide position P0 (a time T5 shown in FIG. 6), the speed command output is turned off to stop the die height adjustment. As described above, the die height adjustment speed is controlled in two steps, and the precision of the stop position is enhanced.

Figure 7:
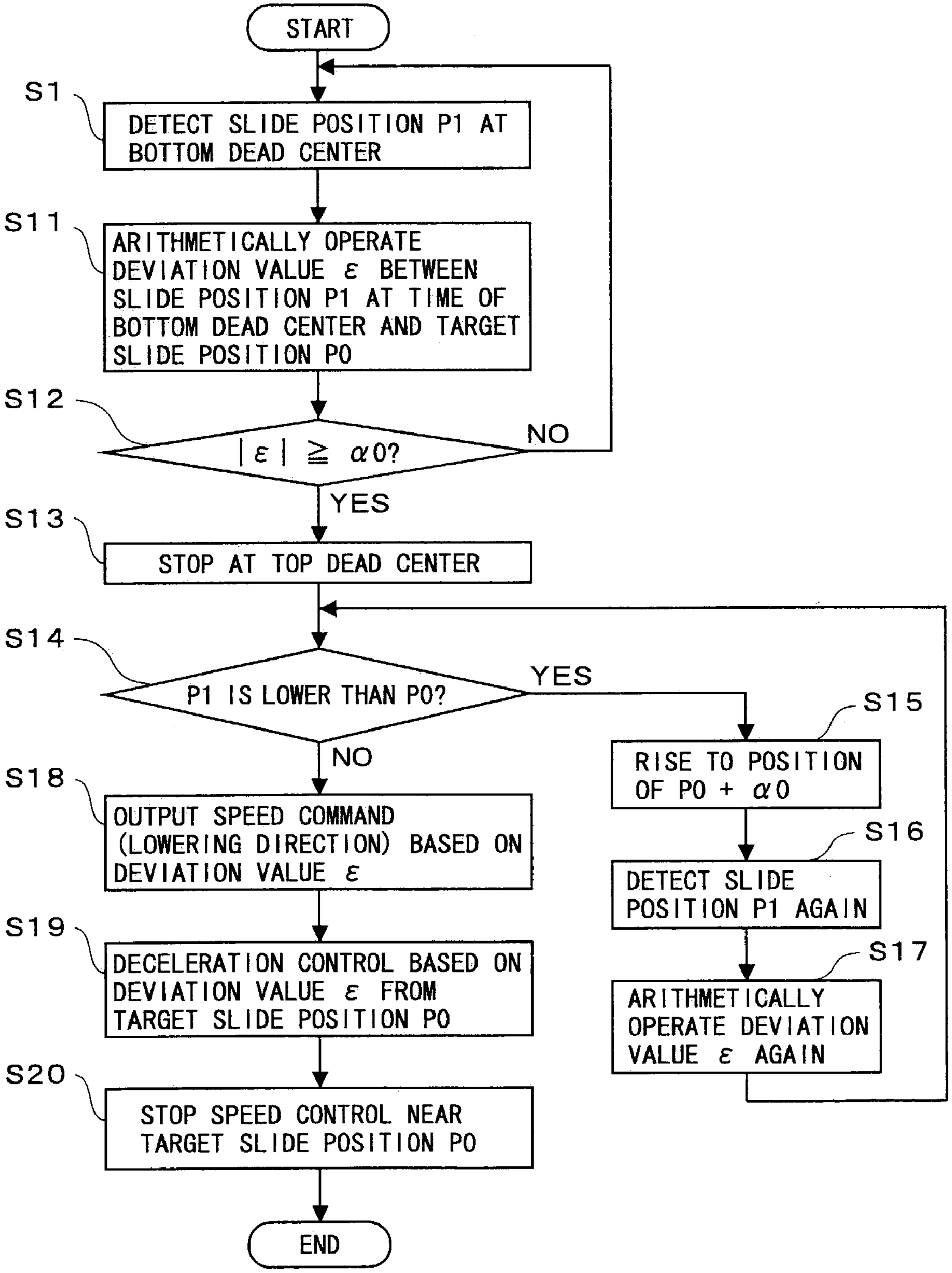
FIG. 7 is a control flowchart of a second embodiment.
Figure 8:
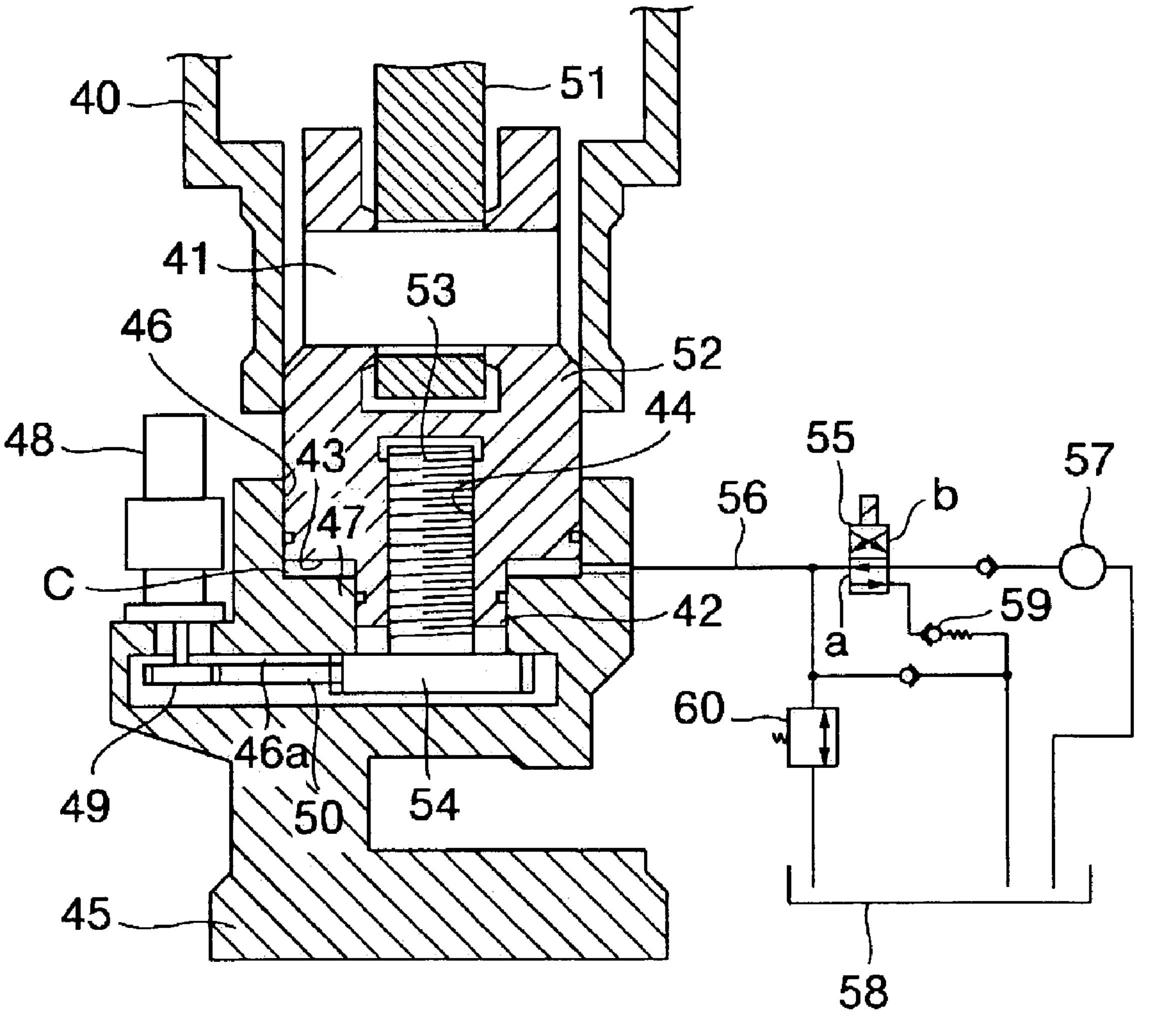
FIG. 8 Prior Art
FIG. 8 is a slide adjusting device according to a prior art.

FIG. 7 is a flowchart showing control procedural steps at the time of die height adjustment of the second embodiment. The same step numbers are given to the steps with the same processes as the process contents in the flowchart in FIG. 5. First, in step S1, the slide position P1 at the bottom dead center is inputted from the position sensor 33. Next, in step S11, the deviation value $\epsilon$ between the slide position P1 at the time of the slide bottom dead center immediately before and the slide position P0 at the time of the bottom dead center corresponding to the target die height value is arithmetically operated. Next, in step S12, it is checked whether the absolute value of the arithmetically operated deviation value $\epsilon$ is not less than a predetermined allowable range $\alpha 0$, and if it is less than the allowable range $\alpha 0$, a command is given to return to step S1 and the above process steps are repeated. When it is not less than the allowable range $\alpha 0$, the slide 3 is stopped at the top dead center in step S13.

In step S14, it is checked whether the slide position P1 is lower than the slide position P0. If it is lower than the slide position P0, a speed command is arithmetically operated to raise the slide to a higher position than the target slide position P0 by the allowable range $\alpha 0$, and is outputted. Thereafter, in step S16, the slide position P1 following this rise of the slide is detected again, then the deviation value $\epsilon$ is newly operated arithmetically in step S17, and a command is given to return to step S14. When the slide position P1 is higher than the slide position P0 in step S14, a command is given to proceed to step S18 as it is.

In step S18, a speed command is arithmetically operated based on the deviation value $\epsilon$, and it is outputted to the inverter 17. As a result, the slide 3 is driven downward by the induction motor 9. Next, in step S19, conversion into the deviation value $\epsilon$ at the bottom dead center is performed based on a moving amount at the time of the slide 3 lowering during the lowering of the slide 3, then the obtained deviation value $\epsilon$ and the slowing down distance L1 are compared, and based on the comparison result, predetermined deceleration process is performed. Thereafter, in step S20, the converted value into the deviation value $\epsilon$ at the bottom dead center based on the moving amount of the slide 3 at the time of lowering during the lowering of the slide 3 and a stopping distance L2, and when the converted value is the stopping distance L2 or smaller, the speed command is stopped to position the slide 3. After the die height adjustment is finished, the operation of the pressing machine is automatically restarted.

According to the second embodiment, the die height adjusting speed at the time of stopping is controlled at a predetermined low speed with the inverter 17, and therefore variations in positioning precision can be reduced, thus making it possible to obtain high positioning precision. Accordingly, the die height is always monitored automatically, and only when the die height adjustment becomes necessary, the slide is automatically stopped at the top dead center to perform highly precise die height adjustment, thus making it possible to perform pressing work of highly precise products with stability. Further, at the time of die height adjustment, a positioning control from one direction (in a lowering direction in the above-described example) is always performed with the slide 3 being stopped at the top dead center, and therefore effects of a mechanical rattle are eliminated, thus making it possible to surely obtain high positioning precision with stability. Further, when the slim induction motor 9 in the flat shape with the small axial length is used as a die height adjusting motor, durability is further improved against large impacts and vibrations exerted on the slide 3 as in the first embodiment. Further, an installation space can be easily secured in the small slide.

In the second embodiment, when the positioning control is always performed from one direction (in the lowering direction in the above-described example) with the slide 3 being stopped at the top dead center, the die height adjustment is performed by driving the slide to the position at the predetermined distance before the target slide position at the first fixed speed, and thereafter, driving the slide to the target slide position at the second fixed speed which is lower than the first fixed speed. However, this is not restrictive, and as in the first embodiment, the minimum necessary voltage application time and a very small unit adjustment amount corresponding thereto may be set, and voltage application to the induction motor for a predetermined period of time may be performed once or a plurality of times to perform die height adjustment. A very small amount of adjustment such as die height adjustment for a thermal change can be especially performed with high precision, and can be completed with arithmetic operation processing for a short time.

In the above embodiments, the mechanism of the press driving system is explained with the example constituted by the combination of the pulleys and the belt, the link mechanism and the eccentric shaft, but the present invention is not limited to this, and it is applicable to the other mechanisms. For example, a mechanism with only ball screws, a combination of ball screws and a link mechanism, a combination of a crank mechanism and a link mechanism and the like may be used. The explanation is made with the example of the servo press which is slidingly driven by the power of the servo motor 21, but the present invention is also applicable to a mechanical press, and it goes without saying that the same effects as described above can be obtained in the control of the die height adjustment in this case. Further, the mechanism which performs die height adjustment via the worm gear 8 and the screw shaft 7 is adopted, but the other power transmission mechanisms may be used. Furthermore, the constitution mounted with the slim induction motor 9 with its axial direction facing horizontally is adopted, but it may be mounted with its axial direction facing vertically.

The effects according to the present invention are as follows. By setting the minimum necessary voltage application time and the very small unit adjustment amount corresponding thereto, die height adjustment for a thermal change in the press frame of which adjustment amount for one time is very small can be carried out without stopping the pressing machine, or stopping the slide at the top dead center. In addition, if feedback of the slide position is always performed, production including both high-speed production and high precision forming is made possible with the die height being always kept fixed without being influenced by a thermal change. Further, die height adjustment with high precision is made possible by stopping the slide at the top dead center for a short time and performing the two-step speed control and one direction adjustment, only when the die height change amount reaches a predetermined amount. Further, when the slim induction motor in the flat shape in the axial direction is used for the die height adjustment, durability is enhanced against impacts and vibrations of large acceleration occurring at the time of pressing work, and an installation space can be easily secured even in the small slide.

What is claimed is:

1. A die height adjusting device for a pressing machine, comprising:

an induction motor which performs die height adjustment of a slide of the pressing machine; and an inverter which performs speed control of said induction motor;

wherein a unit adjustment amount of the die height adjustment is predetermined together with a magnitude of a voltage command to the induction motor and a voltage application time corresponding to the unit adjustment amount; and wherein a predetermined amount of the die height adjustment is performed by performing the unit adjustment amount of the die height adjustment at least one time.

2. The die height adjusting device for the pressing machine according to claim 1, wherein said induction motor comprises a slim type induction motor having a flat shape with an axial length thereof being short.

3. A die height adjusting device for a pressing machine comprising:

an induction motor which performs die height adjustment of a slide of the pressing machine; and an inverter which performs speed control of said induction motor;

wherein a predetermined amount of die height adjustment is performed in one cycle of vertical drive of said slide by applying voltage to said induction motor for a predetermined period of time while said slide is located outside a forming area in said one cycle of the vertical drive of said slide.

4. The die height adjusting device for the pressing machine according to claim 3, wherein said induction motor comprises a slim type induction motor having a flat shape with an axial length thereof being short.

5. A die height adjusting device for a pressing machine comprising:

an induction motor which performs die height adjustment of a slide of the pressing machine;

an inverter which performs speed control of said induction motor;

a position sensor which detects a present slide position; and a controller which issues a command to said inverter to perform a predetermined amount of the die height adjustment by applying voltage to said induction motor for a predetermined period of time, based on the present slide position detected by said position sensor;

wherein at a time of the die height adjustment, said controller compares a target slide position and the present slide position, and i) when the present slide position is at a lower position than the target slide position, said controller first continuously drives said induction motor to move said slide to a position higher than the target slide position, and then applies the voltage to said induction motor for the predetermined period of time at least once until said slide moves downward to the target slide position, and ii) when the present slide position is at a higher position than the target slide position, said controller applies the voltage to said induction motor for the predetermined period of time at least once until said slide moves downward to the target slide position.

6. The die height adjusting device for the pressing machine according to claim 5, wherein said induction motor comprises a slim type induction motor having a flat shape with an axial length thereof being short.

7. A die height adjusting device for a pressing machine comprising:

an induction motor which performs die height adjustment of a slide of the pressing machine;

an inverter which performs speed control of said induction motor;

a position sensor which detects a present slide position; and a controller which issues a command to said inverter to perform the die height adjustment via said induction motor, based on the present slide position detected by said position sensor, wherein at a time of the die height adjustment, said controller controls said induction motor at a predetermined first speed to drive said slide to a position at a predetermined distance before a target slide position, and thereafter controls said induction motor at a second speed, which is lower than the first speed, to drive said slide to the target slide position.

8. The die height adjusting device for the pressing machine according to claim 7, wherein at the time of the die height adjustment, said controller compares the target slide position and the present slide position before it controls said induction motor at the first speed and the second speed, and i) when the present slide position is at a lower position than the target slide position, said controller drives said induction motor to move said slide to a higher position than the target slide position and, then controls said induction motor at the first speed and the second speed to move said slide downward, and ii) when the present slide position is at a higher position than the target slide position, said controller controls said induction motor at the first speed and the second speed to move said slide downward.

9. The die height adjusting device for the pressing machine according to claim 8, wherein said induction motor comprises a slim type induction motor having a flat shape with an axial length thereof being short.

10. The die height adjusting device for the pressing machine according to claim 7, wherein said induction motor comprises a slim type induction motor having a flat shape with an axial length thereof being short.

* * * * *